Nov. 20, 1962   W. KASTEN   3,064,818
FUEL FILTER AND WATER SEPARATOR UNIT
Filed Dec. 19, 1958   2 Sheets-Sheet 1
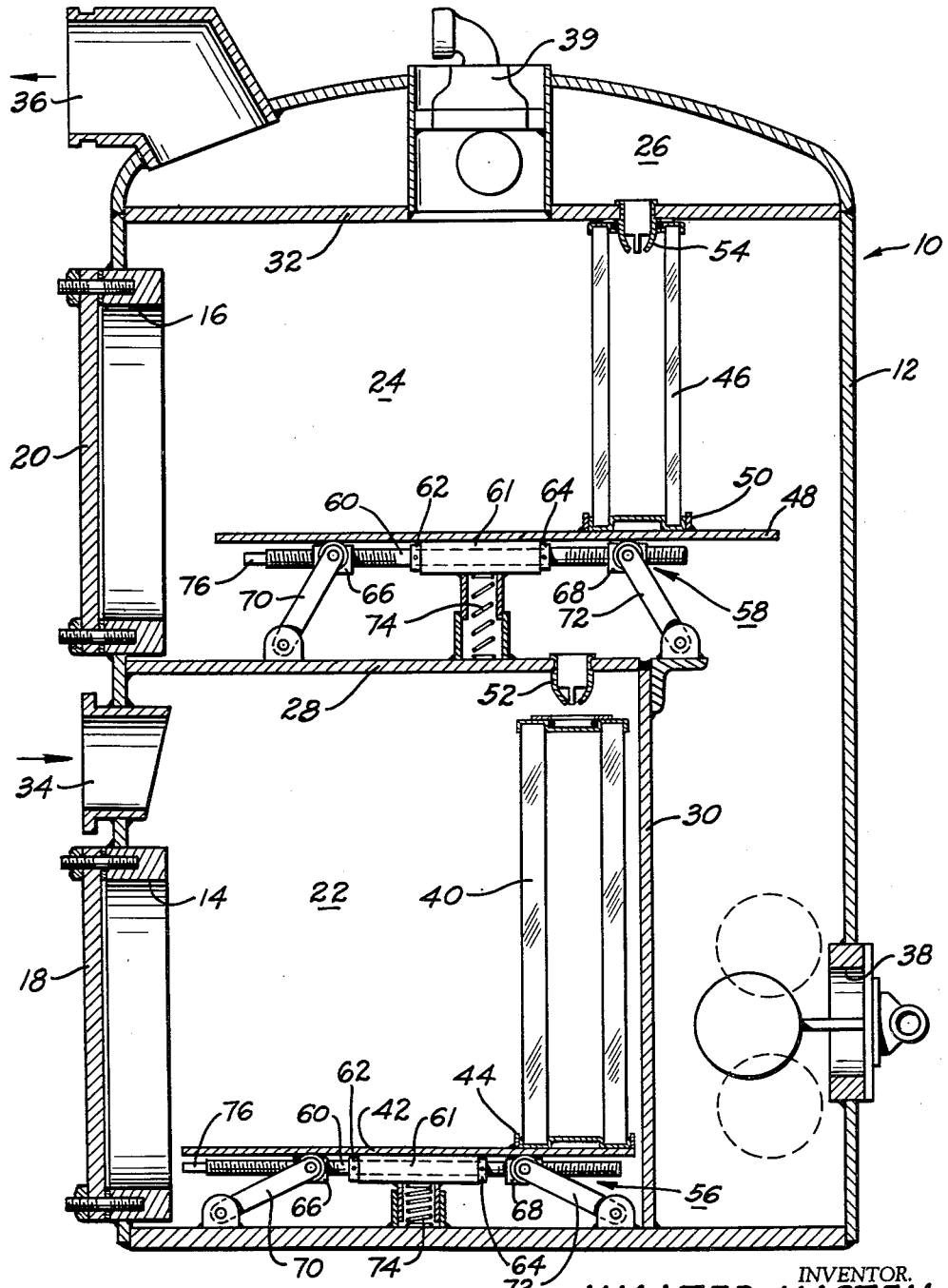
FIG_1
INVENTOR.
WALTER KASTEN.
BY
William N. Antonis
ATTORNEY.

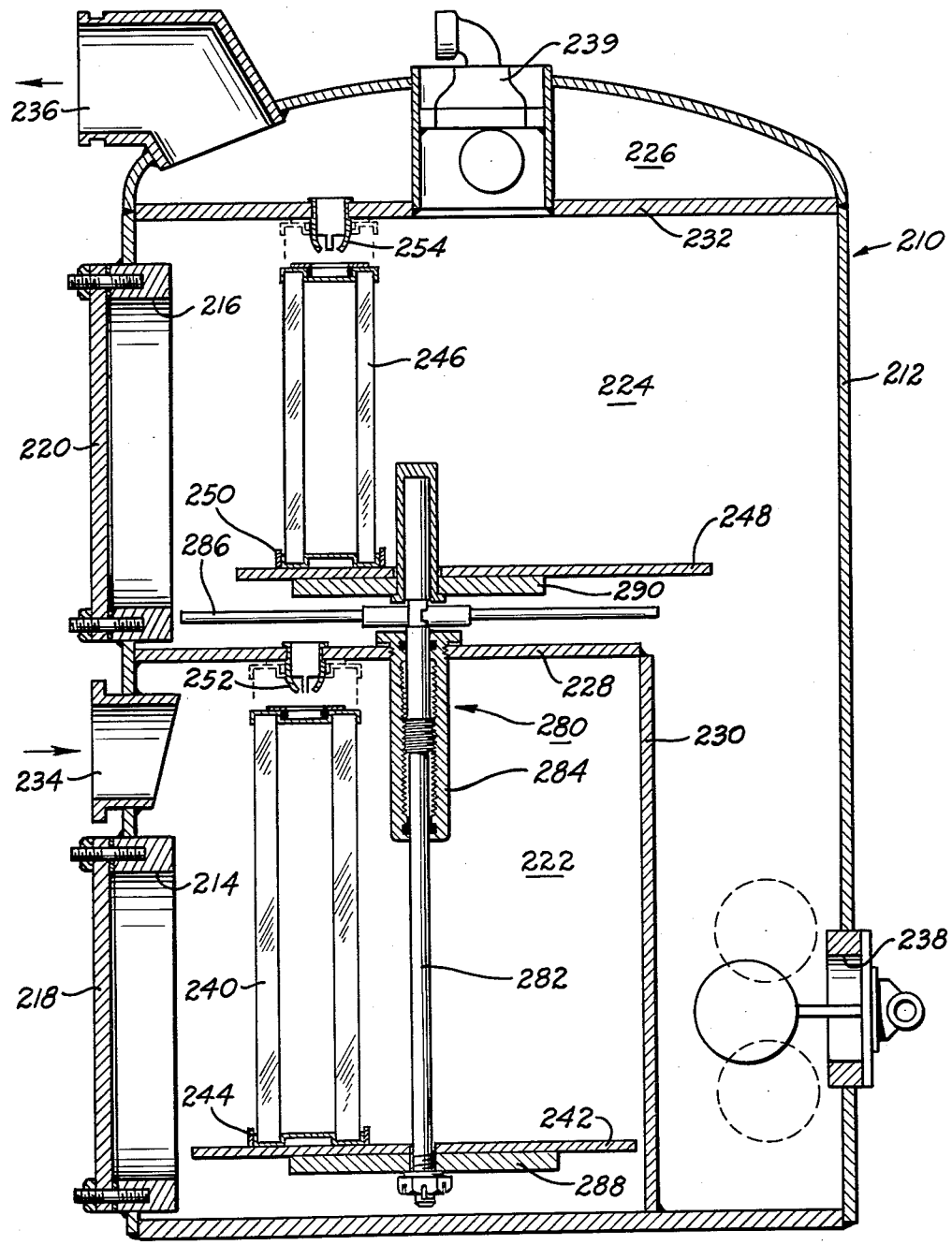

United States Patent Office 3,064,818
Patented Nov. 20, 1962

3,064,818
FUEL FILTER AND WATER SEPARATOR UNIT
Walter Kasten, Madison Heights, Mich., assignor to The Bendix Corporation, a corporation of Delaware
Filed Dec. 19, 1958, Ser. No. 781,559
6 Claims. (Cl. 210—238)

This invention relates to fuel filter and water separator units and more particularly to a filter element installation aid and mount.

In this day and age because of the greater ful requirements of jet planes and the need to reduce ground time for refueling aircraft, larger fuel filter separators are required. The fuel tank capacity of many large commercial jet liners is in excess of 20,000 gallons. Even at fueling rates of close to 1000 gallons per minute, it would take almost one half hour to refuel the plane. Filter separators of this size require a great number of filter elements, as many as 100 for a 1000 g.p.m. filter. As the number of elements increase, the size of the filter tank increases accordingly.

To provide removable filter covers and still have leak-tight flange seals, thick flanges and many bolts are required. Furthermore, to remove a cover of this type, a hoist or davit is required. It takes a great deal of time to remove bolts, gaskets, etc., and the tank cost is increased since the flanges must be welded, drilled and machined.

With these thoughts in mind, it is an object of this invention to reduce the construction cost and to simplify servicing of such units. It has been found that this object may be achieved in part by providing units with welded end covers and with hand or access holes in the wall of the tank to permit servicing. While this method reduces the initial tank cost, it still requires a considerable amount of time to install the elements with conventional element mounts such as rods or springs.

It is, therefore, an object of this invention to reduce the element replacement service time and cost.

Another object of this invention is to reduce the element mounting hardware cost by eliminating such items as springs, rods, etc.

A further object of this invention is to provide a movable platform, so that a plurality of filter elements may be easily placed thereon in their approximate installed positions, said platform having a mechanism associated therewith for raising the platform and elements to an operative position.

A still further object of this invention is to provide pilot means above the movable platform for guiding the filter elements to their predetermined aligned positions upon movement of said platform in an upward direction and for retaining said elements in said predetermined positions in conjunction with said platform.

Other objects and advantages will become apparent from the following description and accompanying drawing drawings, wherein:

FIGURE 1 is a vertical section of a fuel filter water separator incorporating my invention; and FIGURE 2 is a vertical section of a fuel filter water separator incorporating another embodiment of my invention.

Referring to FIGURE 1 of the drawings, numeral 10 designates a tank or casing having a substantially cylindrical wall 12 in which two hand or access holes 14 and 16 are provided. These holes are covered by plates 18 and 20, respectively, when the elements within tank 10 are not being serviced. The tank is divided into three chambers 22, 24 and 26 by partitions 28, 30 and 32. Inlet port 34 communicates with chamber 22, outlet port 36 communicates with chamber 26, and water sump port 38 communicates with chamber 24, said sump port permitting removal of the water separated from the fuel. An air eliminator 39 is provided at the top of the tank.

A plurality of suitable demulsifier elements 40 (only one of which is shown) are located in chamber 22 and rest on a movable platform 42. A plurality of receptacles 44 (only one of which is shown) are formed on the platform for receiving and retaining the elements 40 substantially in their aligned positions. Similarly, in chamber 24 are located a plurality of filter elements 46 (only one of which is shown) which rest on a movable platform 48. A plurality of receptacles 50 (only one of which is shown) are also formed on platform 48 for receiving and retaining the elements 46 substantially in their aligned positions.

Instead of providing for standard spring mounts or rods, a plurality of slotted tubes 52 and 54 (only one of which is shown) are placed in partitions 28 and 32 respectively so as to project several inches below the partitions and serve as element pilots. For ease of alignment, the struts of the slotted pilot tubes are bent inwardly. Thus, when the platforms are moved in an upward direction the tubes 52 and 54 guide the elements associated therewith to their predetermined aligned positions and retain them in these positions in conjunction with the receptacles 44 and 50 formed on the platforms.

Operatively connected to each of the platforms 42 and 48 are mechanisms 56 and 58, each of which operate independently of each other, for raising the platforms 42 and 48 respectively. Since both of these mechanisms are essentially the same, only one set of numerals will be used in describing both. Each mechanism is basically one half of a scissors jack and includes a threaded member 60 having right hand threads on one end and left hand threads on the other end, a sleeve 61, bushings 62 and 64 on either end of sleeve 61 which are pinned to the threaded member 60 to prevent axial movement of the member upon rotation thereof, movable nut members 66 and 68 which threadedly engage the ends of threaded member 60, and struts 70 and 72 which are pivotally connected to the nut members 66 and 68 and to the bottom of tank 10. In chamber 24 the struts are connected to partition 28. A spring 74 is utilized to counterbalance the weight of the platform and elements.

Operation of the FIGURE 1 embodiment is as follows:

The contaminated fuel will enter into chamber 22 through inlet port 34 and will collect around the demulsifier elements 40. Because of the pressure drop across the elements, the fuel will be forced therethrough, leaving any particles of solid matter which may be present on the outside surface of the demulsifier elements. As the fuel passes through the demulsifier elements, the tiny droplets of water dispersed in the fuel are coalesced into larger droplets and pass into chamber 24 where they will tend to settle to the bottom, since water is heavier than fuel. Because of the speed of the fuel through the unit, some of the water, although coalesced into large drops, may be carried along with the fuel to the filter elements 46. These drops of water cannot pass through this filter and therefore will collect on the outside of the element and subsequently drop to the bottom of the tank. The fuel will be purified further by passing through the elements 46 into chamber 26, from whence it will flow out of the tank through outlet 36.

With regard to installation and servicing of the elements within the unit, the plates 18 and 20 are removed from access holes 14 and 16 so that a crank may be attached to the end of threaded members 60 at 76 for cranking the platforms 42 and 48 to their lowest positions. After removing the old elements, new elements are placed in receptacles 44 and 50. Each platform is then individually cranked up towards its uppermost position where guide tubes 52 and 54 enter the opposite ends of the elements and retain the elements in predetermined aligned relationship in connection with the receptacles 44 and 50 formed on the platforms.

Referring to FIGURE 2 wherein like parts are given the same numerals plus 200, it will be noted that the basic distinction between this embodiment and the FIGURE 1 embodiment lies in the mechanism 280 used to raise platforms 242 and 248 simultaneously. Mechanism 280 includes a vertical jack screw rod 282, a bushing 284 internally threaded onto jack screw 282 and externally threaded onto partition 228, and a spider 286 suitably attached to rod 282 for rotating the jack screw. Also suitably attached to jack screw rod 282 are plates 288 and 290 for supporting and raising platforms 242 and 248.

The operation of the FIGURE 2 embodiment is the same as the FIGURE 1 embodiment except that during installation and servicing rotation of the spider 286 will lower or raise both of the platforms 242 and 248 simultaneously.

The raising or lowering of the platforms containing the elements can be accomplished by many other convenient ways. For instance, an arrangement of wire cables and pulleys, cams or levers, hydraulic pistons or jacks, linkages or other means could be used.

Consequently, although this invention has been described in connection with certain specific embodiments, it will be obvious to those skilled in the art that various changes may be made in the form, structure and arrangement of parts without departing from the spirit of the invention. Accordingly, applicant does not desire to be limited to the specific embodiments disclosed herein primarily for purposes of illustration, but instead desires protection falling within the scope of the appended claims.

Having thus described the various features of the invention, what I claim as new and desire to secure by Letters Patent is:

1. A fuel filter and water separator unit comprising a casing having first and second partition means for dividing said casing into first, second, and third chambers, an inlet port communicating with said first chamber, an outlet port communicating with said third chamber, and a sump port communicating with said second chamber for permitting removal of water separated from the fuel, passage means located in said partition means for communicating said first chamber with said second chamber and said second chamber with said third chamber, a plurality of demulsifier elements located in said first chamber for permitting passage therethrough of fuel flowing from said first to said second chamber, a plurality of filter elements located in said second chamber for permitting passage therethrough of fuel flowing from said second to said third chamber, a first platform located in said first chamber for supporting said demulsifier elements, a second platform located in said second chamber for supporting said filter elements, means formed on each of said platforms for receiving and retaining said elements in substantially aligned positions, pilot means located on said first and second partition means above said first and second platforms respectively for guiding said elements to their predetermined aligned positions upon movement of said platforms in an upward direction and for retaining said elements in said predetermined positions in conjunction with the retaining means formed on said platforms, and means operatively connected to said first and second platforms for moving said platforms from one position to another.

2. A fuel filter and water separator unit as defined in claim 1 wherein said means for moving said platforms includes a first mechanism operatively connected to said casing and said first platform for moving said first platform from one position to another and a second mechansim operatively connected to said first partition means and said second platform for moving said second platform from one position to another.

3. A fuel filter and water separator unit as defined in claim 1 wherein said means for moving said platforms includes a mechanism operatively connected to said first partition means and each of said first and second platforms for simultaneously moving each of said first and second platforms from one position to another.

4. An appartaus for removing contaminants from a fluid comprising a casing having partition means for dividing said casing into first, second, and third chambers, an inlet port communicating with said first chamber, an outlet port communicating with said third chamber, and a sump port communicating with said second chamber for permitting removal of contaminating liquids separated from said fluid, passage means located in said partition means for communicating said first chamber with said second chamber and said second chamber with said third chamber, a plurality of elements located in said first and second chambers for separating the contaminants from said fluid as said fluid flows between communicating chambers, platform means located in said first and second chambers for supporting said elements, means formed on said platform means for receiving and retaining said elements in substantially aligned positions, pilot means located on said partition means above said platform means for guiding said elements to their predetermined aligned positions upon movement of said platform means in an upward direction and for retaining said elements in said predetermined positions in conjunction with the retaining means formed on said platform means, and means operatively connected to said platform means for moving same from one position to another.

5. An apparatus for removing contaminants from a fluid comprising a casing having partition means for dividing said casing into first, second, and third chambers, an inlet port communicating with said first chamber, an outlet port communicating with said third chamber, and a sump port communicating with said second chamber for permitting removal of contaminating liquids separated from said fluid, passage means located in said partition means for communicating said first chamber with said second chamber and said second chamber with said third chamber, a plurality of elements located in said first and second chambers for separating the contaminants from said fluid as said fluid flows between communicating chambers, first platforms means located in said first chamber for supporting the elements therein, second platform means located in said second chamber for supporting the elements therein, means formed on each of said platform means for receiving and retaining said elements in substantially aligned positions, pilot means located on said partition means above said first and second platform means respectively for guiding said elements to their predetermined aligned positions upon movement of said platform means in an upward direction and for retaining said elements in said predetermined positions in conjunction with the retaining means formed on said first and second platform means, a first mechanism operatively connected to said casing and said first pltaform means for moving said first platform means from one position to another, and a second mechanism operatively connected to said partition means and said second platform means for moving said second platform means from one position to another.

6. An apparatus for removing contaminants from a fluid comprising a casing having partition means for dividing said casing into first, second, and third chambers, an inlet port communicating with said first chamber, an outlet port communicating with said third chamber, and a sump port communicating with said second chamber for permitting removal of contaminating liquids separated from said fluid, passage means located in said partition means for communicating said first chamber with said second chamber and said second chamber with said third chamber, a plurality of elements located in said first and second chambers for separating the contaminants from said fluid as said fluid flows between communicating chambers, first platform means located in said first chamber for supporting the elements therein, second platform means located in said second chamber for supporting the elements therein, means formed on each of said platform means for receiving and retaining said elements in substantially aligned positions, pilot means located on said partition means above said first and second platform means respectively for guiding said elements to their predetermined aligned positions upon movement of said platform means in an upward direction and for retaining said elements in said predetermined positions in conjunction with the retaining means formed on said first and second platform means, and mechanism operatively connected to said partition means and each of said first and second platform means for simultaneously moving each of said first and second platforms from one position to another.

References Cited in the file of this patent
UNITED STATES PATENTS

| | | |
|---|---|---|
| 1,058,737 | Elliott | Apr. 15, 1913 |
| 1,483,858 | Hepburn | Feb. 12, 1924 |

UNITED STATES PATENT OFFICE
CERTIFICATE OF CORRECTION

Patent No. 3,064,818                  November 20, 1962

Walter Kasten

It is hereby certified that error appears in the above numbered patent requiring correction and that the said Letters Patent should read as corrected below.

Column 1, line 11, for "ful" read -- fuel --; column 3, line 8, for "dies" read -- lies --; column 4, line 59, for "pltaform" read -- platform --.

Signed and sealed this 23rd day of July 1963.

(SEAL)
Attest:

ERNEST W. SWIDER
Attesting Officer

DAVID L. LADD
Commissioner of Patents